United States Patent [19]

Dern et al.

[11] Patent Number: 5,330,157
[45] Date of Patent: Jul. 19, 1994

[54] ROTARY DISK VALVE

[75] Inventors: Charles D. Dern, Feasterville; David L. Ho, Hatboro, both of Pa.

[73] Assignee: Hull Corporation, Hatboro, Pa.

[21] Appl. No.: 98,145

[22] Filed: Jul. 28, 1993

[51] Int. Cl.[5] .............................................. F16K 1/22
[52] U.S. Cl. .................................... 251/162; 251/163
[58] Field of Search ................................ 251/162, 163

[56]  References Cited

U.S. PATENT DOCUMENTS

| | | | |
|---|---|---|---|
| 2,673,061 | 3/1954 | Broz | 251/163 X |
| 2,833,511 | 5/1958 | Fletcher | 251/218 |
| 2,934,310 | 4/1960 | Kinney et al. | 251/163 |
| 3,065,950 | 11/1962 | Goldberg | 251/160 |
| 3,498,583 | 3/1970 | Friedell | 251/162 |
| 3,521,857 | 7/1970 | Over | 251/305 |
| 3,776,505 | 12/1973 | Nohashimi | 251/163 |
| 3,843,090 | 10/1974 | Schneider et al. | 251/163 X |
| 4,817,916 | 4/1989 | Rawstron | 251/163 |
| 4,921,212 | 5/1990 | de Quay | 251/163 |
| 5,118,078 | 6/1992 | Younker | 251/160 |

FOREIGN PATENT DOCUMENTS

| | | | |
|---|---|---|---|
| 605688 | 5/1926 | France | 251/163 |
| 903215 | 9/1945 | France | 251/162 |

*Primary Examiner*—John C. Fox
*Attorney, Agent, or Firm*—Olson & Olson

[57] ABSTRACT

A rotary disk valve has a valve body provided with an annular valve seat section defining a central opening to be removably closed by a valve disk. The valve disk is supported by a drive assembly which includes a drive shaft mounted on the valve body and supporting a drive link for rotation with the shaft. The link mounts a valve disk support shaft which extends slidably through a slot in a bracket secured to the valve disk. The bracket mounts a guide cam follower pin arranged to engage a guide cam secured to the valve body. The arrangement of drive shaft, valve disk support shaft, bracket slot and guide cam and follower is such that rotation of the drive shaft through 180° in one direction first moves the valve disk from open position disposed in a plane substantially perpendicular to the plane of the central opening in the valve body to an intermediate position spaced from but parallel to the valve seat surface, and then moves the valve disk linearly into sealing engagement with the valve seat section of the valve body. Reverse rotation of the drive shaft moves the valve disk from open to closed position.

6 Claims, 5 Drawing Sheets

ROTARY DISK VALVE

BACKGROUND OF THE INVENTION

This invention relates to butterfly valves, and more particularly to a valve of improved construction and operation.

Butterfly valves have several problems inherent in their design. Most significant is the adverse generation of particulate matter resulting from the outside diameter of the valve disk scrubbing against the valve liner in order to effect a seal. Additionally, this type of sealing is quite prone to leaking. Still further, replacement of the valve liner requires substantially complete disassembly of the valve. A typical butterfly valve is disclosed in U.S. Pat. No. 3,521,857.

Attempts to improve the effectiveness of butterfly valves have included the association therewith of the structure and function of poppet valves. Some of these hybrid butterfly valves have improved sealing effectiveness, but have not overcome the adverse generation of particulates. Some interfere with flow of material through the valve, while others allow only one-way flow. All involve complex and costly constructions which are not suitable for vacuum and sterile applications. Typical of these hybrid butterfly valves are those disclosed in U.S. Pat. Nos. 5,118,078; 4,921,212; 4,817,916; 3,065,950; and 2,673,061.

SUMMARY OF THE INVENTION

The rotary disk valve of this invention includes a valve disk having an O-ring seal mounted on the face of the disk which confronts the sealing face of an associated valve body. The disk is mounted for pivotal movement through 90° rotation of an actuator shaft between open and partially closed positions, and for linear movement through an additional 90° of rotation of the actuator shaft from the intermediate position into sealing abutment of the O-ring seal against the sealing face of the valve body.

It is the principal objective of this invention to provide a rotary disk valve of the class described that overcomes the aforementioned limitations and disadvantages of prior butterfly valves and hybrid butterfly valves.

Another objective of this invention is to provide a rotary disk valve of the class described that eliminates particulate generation by locating the valve sealing components on confronting surfaces rather than on peripheral surfaces.

Still another objective of this invention is the provision of a rotary disk valve of the class described that is suitable for vacuum and sterile applications.

A still further object of this invention is to provide a rotary disk valve of the class described that presents minimum interference with flow of material through the valve.

A further objective of this invention is the provision of a rotary disk valve of the class described that is of simplified construction for economical manufacture, maintenance and repair.

The foregoing and other objects and advantages of this invention will appear from the following detailed description, taken in connection with the accompanying drawings of a preferred embodiment.

DESCRIPTION OF THE PREFERRED EMBODIMENT

Figure 1:
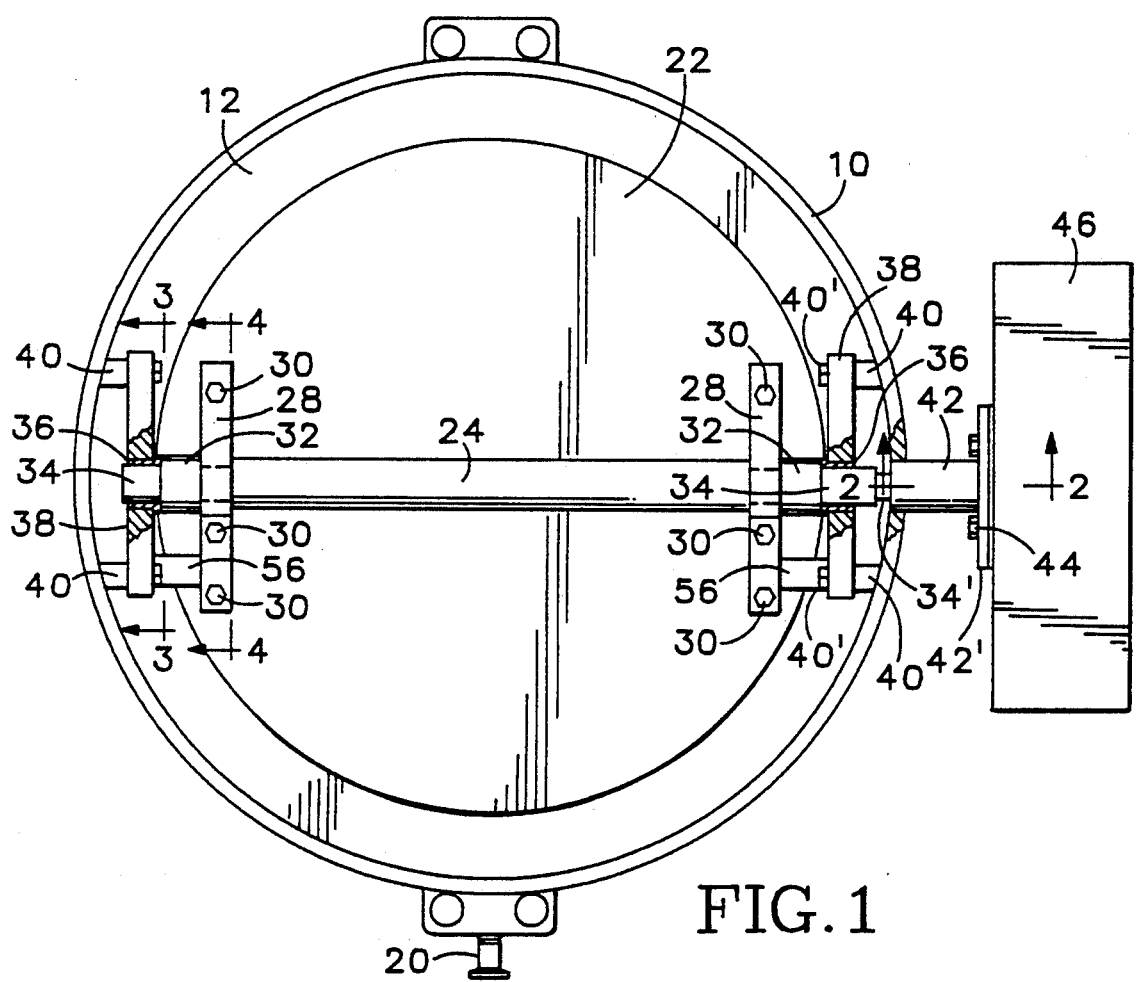
FIG. 1 is a front elevational view of a rotary disk valve embodying the features of this invention, the valve being shown in closed condition with portions being broken away to disclose details of internal construction.

The embodiment of the rotary disk valve of this invention illustrated in FIGS. 1-8 includes a valve body formed of a peripheral section 10 and an annular seat section 12 forming a central opening 14 for the passage of material moving through a horizontally disposed piping system. The piping system is illustrated in the drawings by the pipe flanges 16 which are sealed to the valve body by O-ring seals 18. The valve body is provided with a sanitary port 20 by which the valve may be properly drained.

FIG. 11 is an exploded perspective view of the components shown to the right of center in FIG. 1.

The illustrated valve also includes a valve disk 22 to which is secured an actuation shaft 24. The reduced diameter end portions 24' of the actuation shaft are supported within bearings 26 which are mounted slidably in slots 26' (FIG. 4) formed in laterally spaced brackets 28 secured to the valve disk by screws 30.

The bearing-supported end portions 24' extend laterally outward of the brackets 28 and are journaled in elongated links 32 for rotation relative to the links drive. The links are formed integral with or otherwise secured to stub mounting shafts 34 which are journaled in flanged bearings 36 carried by support brackets 38. The support brackets are secured to mounting lugs 40 on the inner side of the peripheral section 10 of the valve body, as by the screws 40' illustrated.

Figure 2:
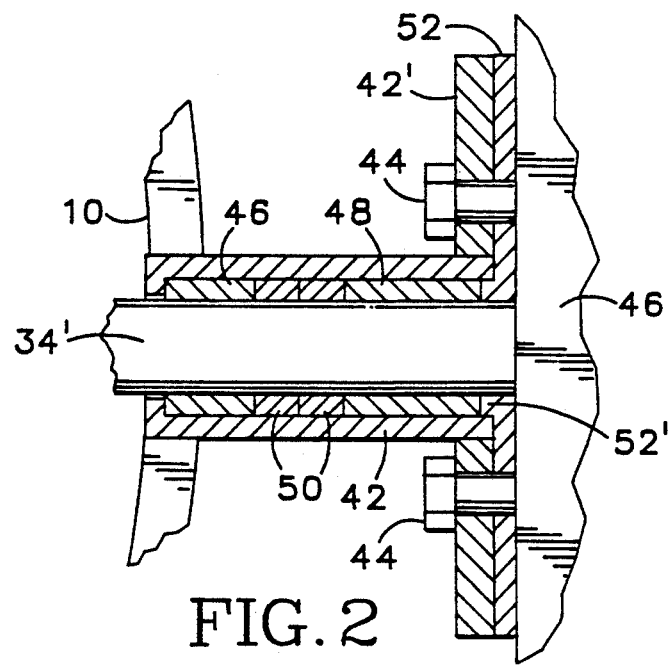
FIG. 2 is a sectional view, on an enlarged scale, taken on line 2—2 in FIG. 1.
Figure 3:
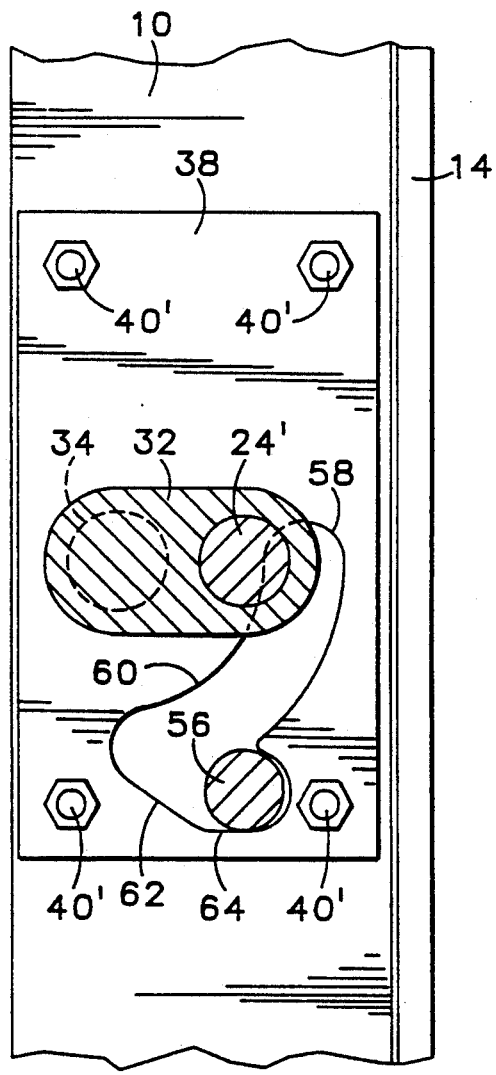
FIG. 3 is a sectional view, on an enlarged scale, taken on the line 3—3 in FIG. 1.
Figure 4:
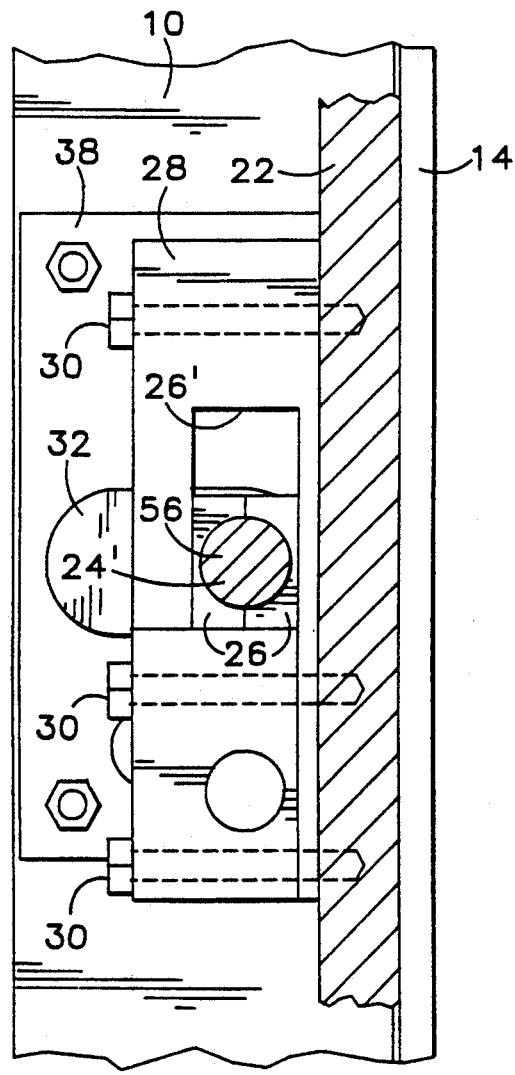
FIG. 4 is a sectional view, on an enlarged scale, taken on the line 4—4 in FIG. 1.

One of the mounting shafts 34 extends laterally outward from its support bracket 38 and terminates in a reduced diameter extension 34' (FIG. 2). This extension projects through the peripheral section 10 of the valve body and is journaled for rotation in bearing housing 42. The flange 42' of the housing is secured, as by bolts 44, to the housing of a rotary actuator 46 that is connected to the extension 34' for rotating the latter. The housing 42 contains bearing segments 46 and 48 separated by packing sets 50. A seal plate 52 is interposed between the housing flange 42' and actuator housing 46 and is provided with an annular lip 52' which extends into the bearing housing 42 for abutment with the adjacent bearing segment 48. The lip serves to maintain a compressive force on the packing sets 50 to prevent leakage around the extension 34'.

The actuator 46 may be a drive motor of the electric or hydraulic type. In the alternative, the actuator may be a rack and pinion drive mechanism powered by an extensible fluid pressure piston-cylinder unit, elongated screw, or other suitable drive. As a further alternative, the actuator extension 34' may be rotated manually with the aid of an elongated actuator lever.

It will be appreciated that since the end portions 24' of the actuation shaft 24 are connected to the bearings 26 and to the drive links 32, rotation of the shaft extension 34' by the actuator 46 effects rotation of the links 32 and shaft 24 about the axis of shaft extension 34' and consequent movement of disk 22 through the attaching brackets 28.

The valve disk 22 is provided with an O-ring seal 54 arranged to bear removably against the confronting sealing surface 12' of the annular seat section 12 of the valve body.

Means is provided for guiding the valve disk into sealing engagement of the O-ring seal 54 with the confronting surface 12' of the annular seat section 12 and coaxial with the opening 14. In the embodiment illustrated, this is provided by guide cam follower pins 56 extending laterally outward from the brackets 28 for sliding engagement with the surfaces of guide cams formed on the brackets 38. Each of the guide cam surfaces includes an upper terminal portion 58, an adjacent arcuate portion 60 having its center of rotation at the axial center of mounting shaft 34, a next adjacent angular portion 62 and a lowermost, horizontal stop portion 64. The guide cam surfaces of each cam form one side of a closed opening in which the pin 56 is confined and thereby maintained in contact with the cam surfaces in during movement between the opposite end portions of the cam surfaces.

The mode of operation of the rotary disk valve described hereinbefore is as follows: Let it be assumed that the valve disk 22 is in the fully closed position illustrated in FIGS. 1 and 5.

Figure 5:
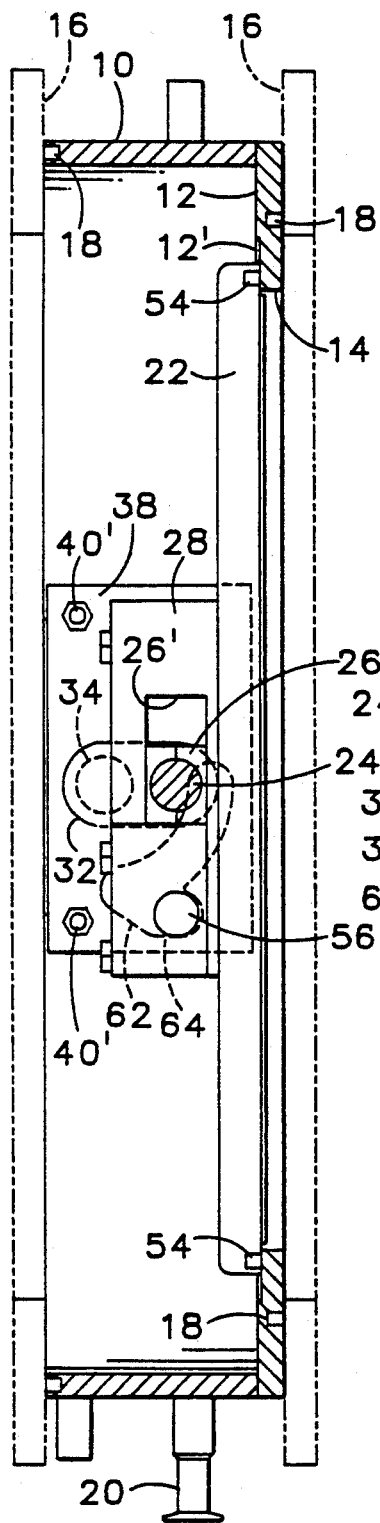
FIGS. 5, 6, 7 and 8 are longitudinal sectional views of the valve of FIG. 1 showing a sequence of stages of movement of the valve disk and associated support components from the fully closed position of FIG. 5 to the fully open position of FIG. 8.

FIG. 5 shows the mounting shafts 34 and drive links 32 rotated fully clockwise (fully counterclockwise in FIG. 11), whereby the bearings 26 and the supported end portions 24' of the valve disk actuation shaft 24 have moved downward in the slots 26' in the brackets 28. Since the guide pins 56 are in engagement with the horizontal stop portions 64 of the guide cams, these stop portions stop the downward movement of the pins 56 and hence the valve disk 22 and bring its the central axis of the disk in alignment with the central axis of the opening 14. The guide pins 56 have moved forwardly (toward the right) along the horizontal stop portions 64 of the guide cams, moving the valve disk 22 into positive sealing engagement of the O-ring seal 54 against the sealing surface 12' of the annular seat surface 12 of the valve body. The seal thus prevents flow of liquids or gases through the valve from either direction.

Figure 6:
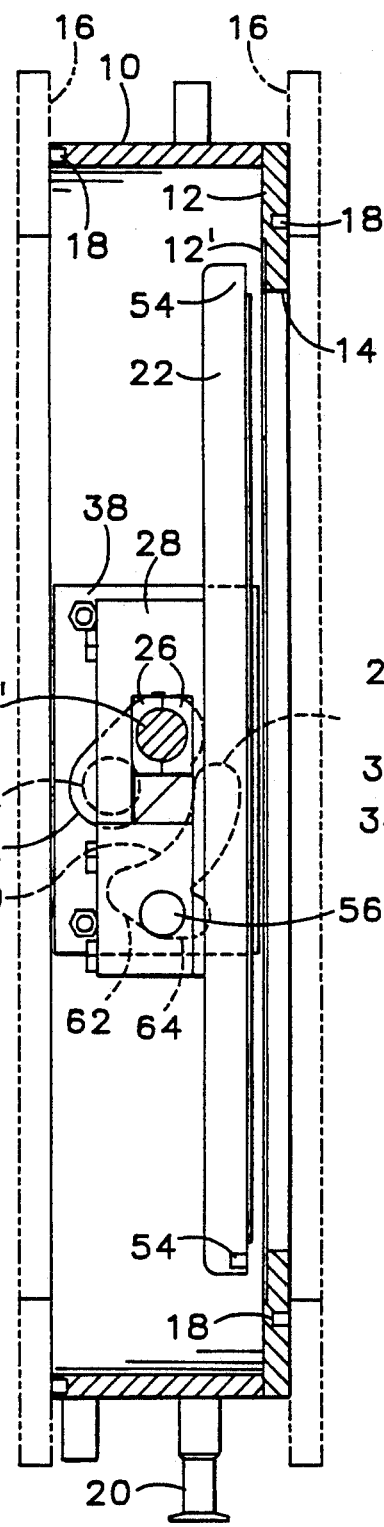

FIG. 6 shows each of the mounting shafts 34 and links 32 rotated counterclockwise about 40° from the position of FIG. 5. During this rotation the guide pins 56 have moved rearwardly (toward the left) along the horizontal portions 64 of the guide cams. The bearings 26 and the end portions 24' have been moved to the upper ends of the slots 26' by counterclockwise rotation of links 32. This results in moving the valve disk 22 to the left a slight distance away from but parallel to the annular sealing surface of the valve body.

Figure 7:
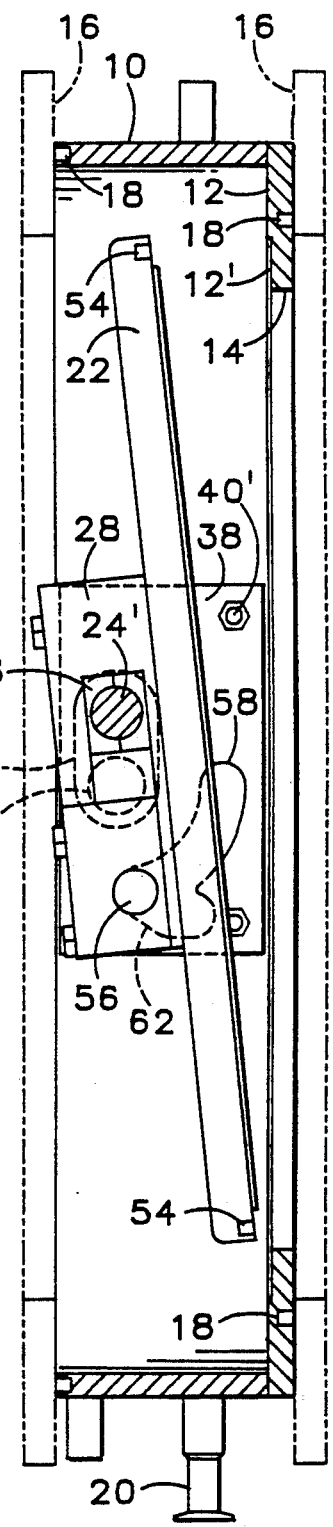

In FIG. 7 the mounting shafts 34 and links 32 have been rotated 50° counterclockwise from the position of FIG. 6 and 90° counterclockwise from the position of FIG. 5. During this rotation the bearings 26 engaging the upper ends of slots 26' are caused to move further upward, carrying with them the brackets 28 and disk 22. The disk thus is moved upwardly relative to the opening 14. Simultaneously, the guide pins 56 have moved upwardly along the angular portions 62 of the guide cams, guiding the valve disk 22 positively to the position illustrated, in which it is disposed adjacent but at a slight angle to and slightly elevated above the center of the valve body opening 14. The upper flat portion of the link 32 is in abutment with the confronting surface of disk 22. The link maintains contact with the disk from this position to the fully open position of FIG. 8, thereby insuring positive and smooth movement of the disk.

Figure 8:
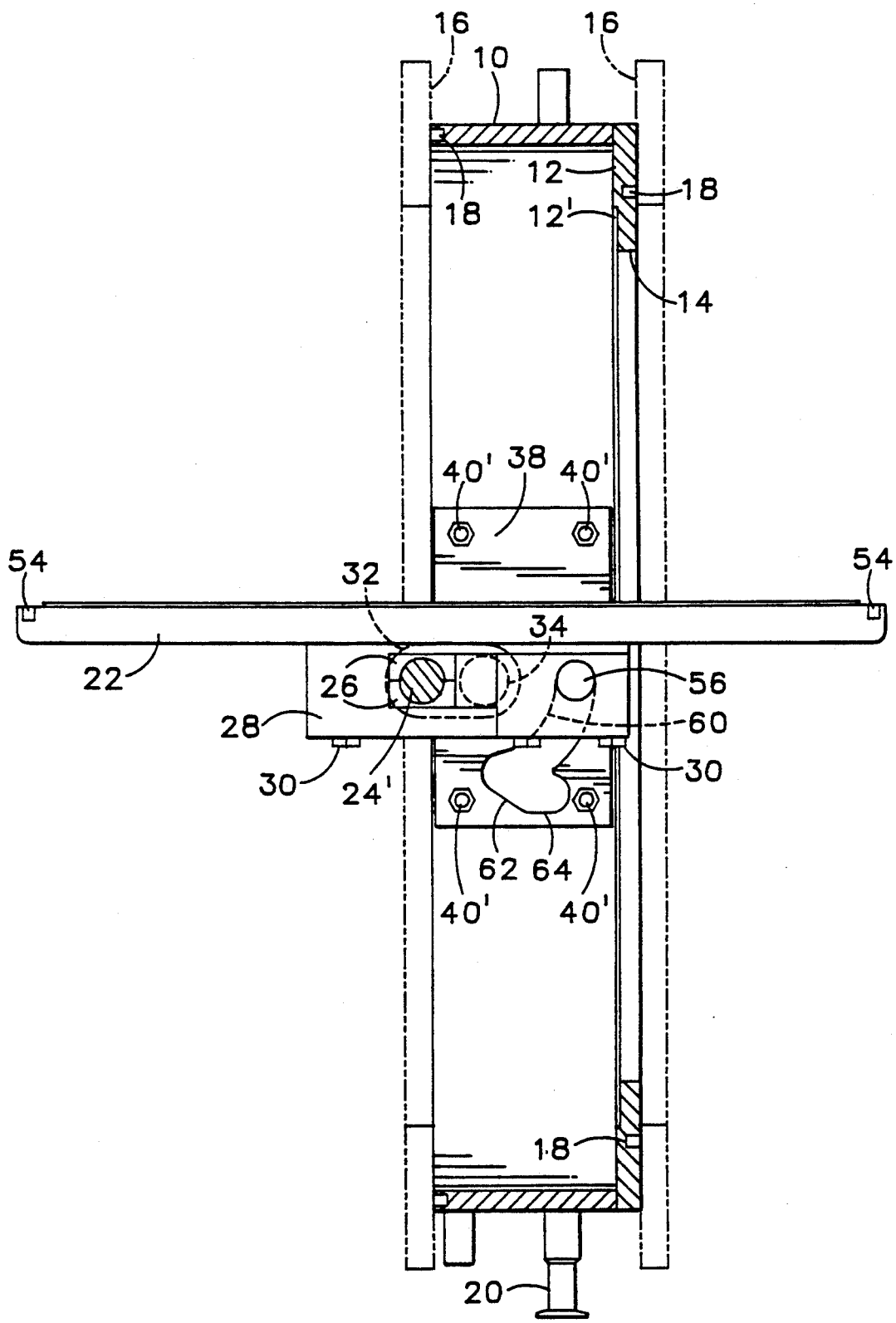

Movement of the valve disk 22 from the position of FIG. 7 to the fully open position of FIG. 8 occurs with rotation of the actuator extension 34' counterclockwise 90°. During this rotation the confronting sides of the links 32 abut the disk 22 to maintain positive control of rotation of the disk. Also, during this rotation the guide pins 56 move arcuately upward along the arcuate portions 60 of the guide cams to the upper terminal portion 58. In this position the plane of the valve disk is substantially perpendicular to the plane of the opening 14 in the valve body. It is to be noted that in this fully open condition the components of the valve assembly present minimum obstruction to passage of material flowing in either direction in the piping system.

FIG. 8 shows the guide pins 56 located in the upper terminal portions 58 of the guide cams. In this position the guide pins are captured between the terminal portion 58 and the confronting surface of the closed slot, to secure the bearings 26 and the end portions 24' of the valve disk support shaft 24 in the outermost ends of the slots 26' in the support brackets 28. The valve disk 22 thus is secured in horizontal, open position. Moreover, the brackets 28, and hence the valve disk 22, are secured against horizontal movement relative to the valve body opening 14, by the captured guide pin 56.

It is to be noted from the foregoing that movement of the valve disk 22 between fully closed and fully open positions involves rotation of the mounting shafts 34 counterclockwise through 180°. Return to the fully closed position of FIG. 5 involves the clockwise rotation of the mounting shafts through 180°, as will be understood. During both movements the valve disk is supported positively by continuous interengagement of the guide pins 56 and the enclosed guide cams.

It is also to be noted that in the closed position of the valve disk 22, the O-ring seal 54 abuts the flat confronting surface 12' of the annular seat section 12, as distinguished from the conventional mode of butterfly valves wherein the seal is achieved by sliding engagement of the peripheral surfaces of the valve disk and valve seat. The rotary disk valve of this invention thus avoids the adverse particulate generation of conventional butterfly valves. The valve of this invention also utilizes a single piece valve disk 22 and a minimum of supporting components, thereby rendering the valve quite suitable for vacuum and sterile applications, as well as minimizing the cost of manufacture, maintenance and repair.

The valve described hereinbefore is shown to be oriented with the axis of the valve body disposed horizontally. In this arrangement, the valve disk 22 is held against the links 32 during movement of the valve disk from the partially open position of FIG. 7 to the fully open position of FIG. 8, by gravity acting to urge the valve disk to rotate clockwise about the common axis of the end portions 24' of the actuation shaft 24. This occurs because greater than half of the valve disk is disposed below the axis of end portions 24' in FIG. 7 and to the right of the axis of said end portions in FIG. 8.

Figure 9:
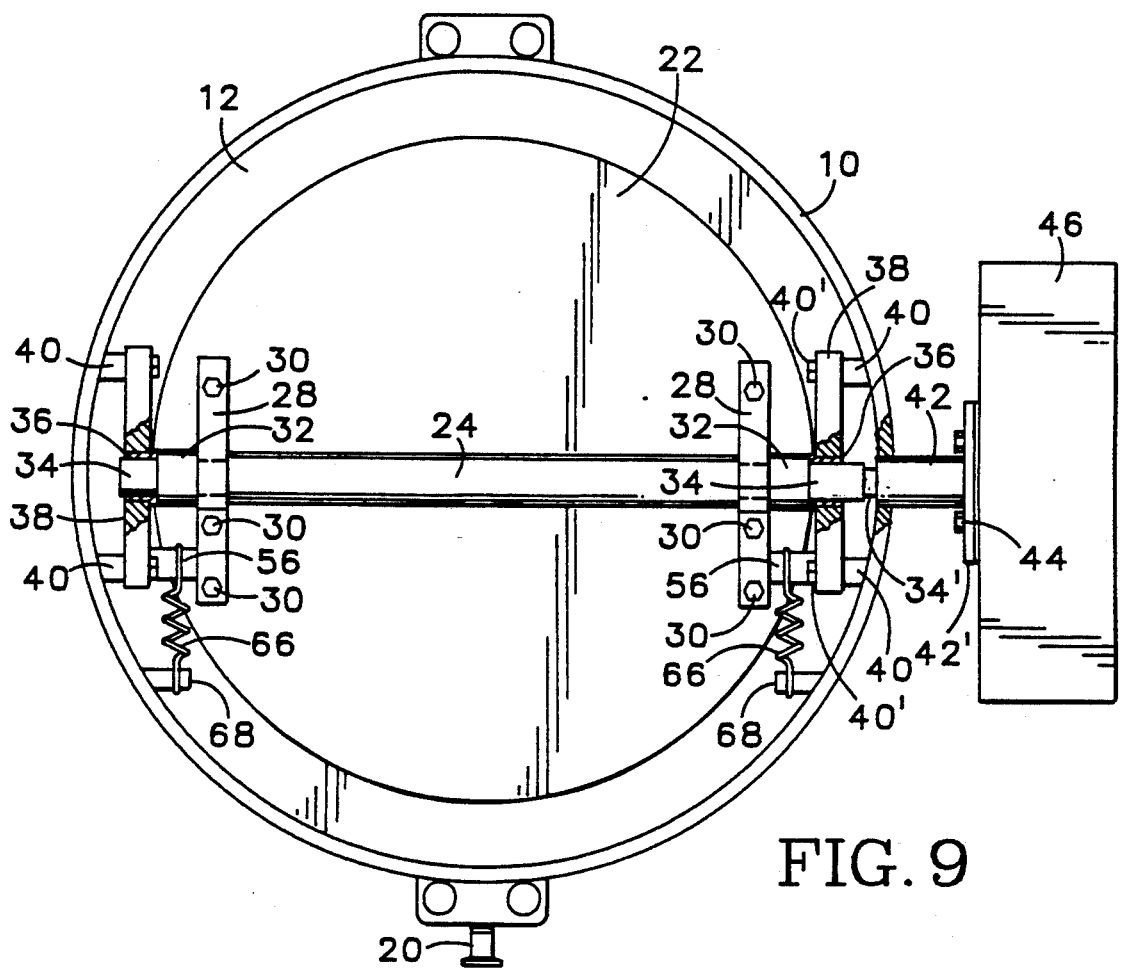
FIG. 9 is a front elevational view of the valve of FIG. 1 modified for operation with the axis of the valve body extending vertically.
Figure 10:
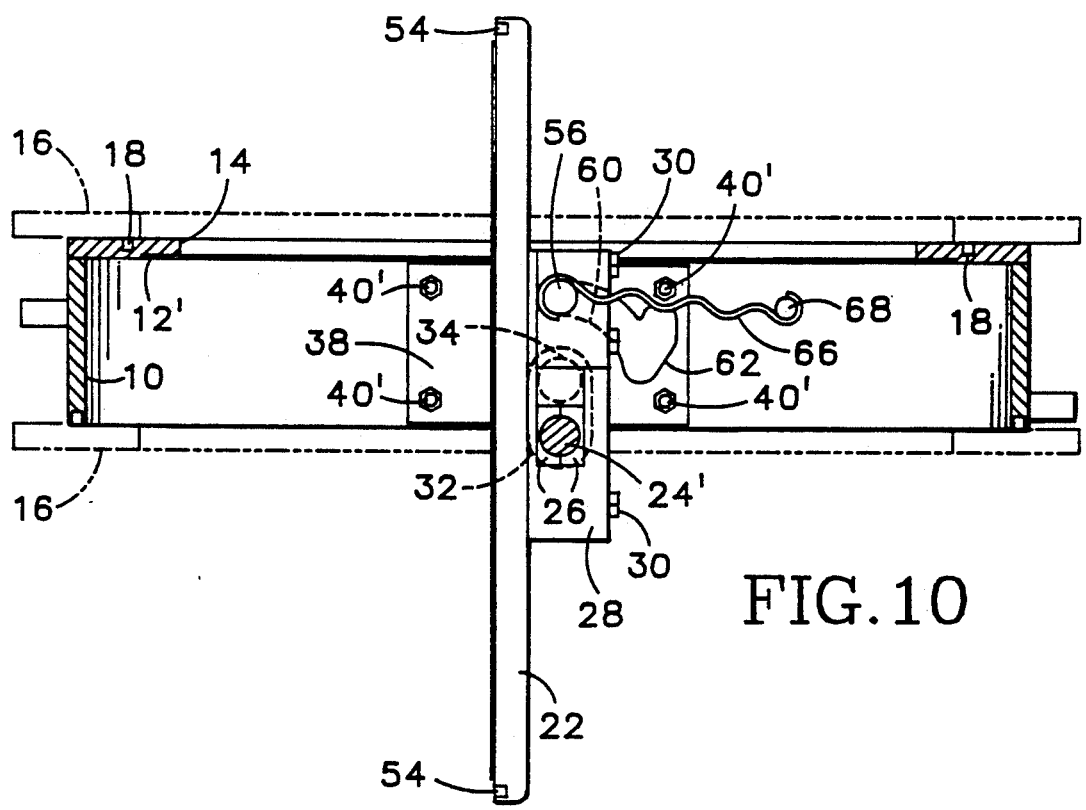
FIG. 10 is a longitudinal sectional view of the valve of FIG. 9 with the valve disk in the fully open position of FIG. 8.

FIGS. 9 and 10 illustrate a modification of the valve assembly of FIG. 1 to accommodate use when the axis of the valve body is disposed vertically, for servicing a vertically disposed piping system. For this purpose coil springs 66 are connected at one end to the guide pins 56 and at the opposite end to mounting studs 68 secured to the peripheral section 10 of the valve body, outwardly of the outer peripheral edge of the valve disk. The springs serve to perform the function of gravity utilized in the horizontally disposed system of FIGS. 1-8, to urge the valve disk toward closed position and maintain the valve disk in engagement with the links 32.

It will be apparent to those skilled in the art that various changes may be made in the size, shape, type, number and arrangement of parts described hereinbefore, without departing from the spirit of this invention and the scope of the appended claims.

We claim:
1. A rotary disk valve, comprising:
a) a valve body having a peripheral section and an annular valve seat section defining a central opening and a radially extending valve seat surface,
b) a valve disk configured to removably seat against said valve seat surface,
c) drive pivot means mounted on the valve body for reversible rotation,
d) drive link means secured to the drive pivot means for rotation therewith,
e) valve disk support shaft means mounted on the drive link means of rotation relative to the drive link means on an axis parallel to but spaced from the axis of rotation of the drive pivot means,
f) guide cam means on the valve body,
g) bracket means on the valve disk supporting the valve disk support shaft means, and
h) guide cam follower means on the bracket means slidably engaging said guide cam means,
i) the drive pivot means, valve disk support shaft means and guide cam means being arranged whereby rotation of the drive pivot means 180° in one direction moves the valve disk first arcuately from fully open position to an intermediate position spaced from said valve seat surface, and then linearly to fully closed position sealed against said valve seat surface.

2. The rotary disk valve of claim 1 including reversible rotary power means connected to said pivot means for rotating said pivot means.

3. The rotary disk valve of claim 1 including interengaging stop means on the valve body and valve disk configured to position the valve disk for linear movement to and from said closed position.

4. The rotary disk valve of claim 1 including resilient means interengaging the valve body and valve disk for urging the valve disk toward closed position.

5. The rotary disk valve of claim 1 including resilient means interconnecting the valve body and guide cam follower means for urging the valve disk toward closed position and maintain the valve disk in engagement with the drive link means.

6. A rotary disk valve comprising:
a) a valve body having a peripheral section and an annular valve seat section defining a central opening and a radially extending valve seat surface,
b) a valve disk configured to removably seat against said valve seat surface and close said central opening,
c) bracket means on the valve disk having elongated slot means therein,
d) support shaft means slidably engaging said slot means,
e) drive pivot means mounted rotatably on the valve body,
f) drive link means secured to the drive pivot means for rotation therewith, the drive link means mounting the support shaft means on an axis spaced from the axis of the drive pivot means,
g) guide cam means on the valve body, and
h) guide cam follower means on the bracket means engaging the guide cam means,
i) whereby rotation of the drive pivot means through 180° effects movement of the valve disk arcuately between fully open position and an intermediate partially open position and linearly between said intermediate position and fully closed position sealed against said valve seat surface.

* * * * *